Nov. 12, 1946.　　　V. A. BURNHAM　　　2,411,127

SPINDLE BRAKE

Filed May 14, 1945

Inventor:
Virgil A. Burnham
by J. H. McCrady,
Attorney.

Patented Nov. 12, 1946

2,411,127

UNITED STATES PATENT OFFICE 2,411,127

SPINDLE BRAKE

Virgil A. Burnham, Saco, Maine, assignor to Saco-Lowell Shops, Boston, Mass., a corporation of Maine Application May 14, 1945, Serial No. 593,643

7 Claims. (Cl. 57—88)

This invention relates to brakes of the type used in twister frames to stop the spindles individually, when desired. The invention aims to devise a simple, exceptionally reliable and rugged brake construction which can be manufactured economically and can be used either as a hand or a knee brake, as desired.

The nature of the invention will be readily understood from the following description when read in connection with the accompanying drawing, and the novel features will be particularly pointed out in the appended claims.

Figure 1:
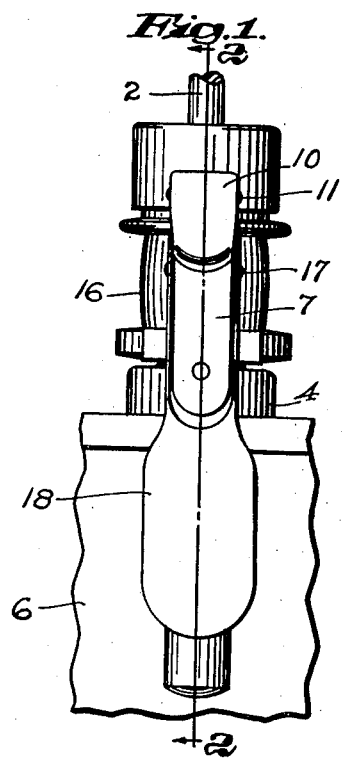
Fig. 1 is a front elevation of a portion of a spindle equipped with a brake embodying this invention.

The construction shown comprises a spindle blade 2 supported for rotation in a bolster 3 mounted in the spindle base 4 which is secured by a nut 5 to a spindle rail 6. Projecting from one side of the main body of the base 4, and integral therewith, is a bracket 7 which is drilled to form a spout through which oil is introduced to replenish the supply in the oil well 8. A cover for the open upper end of the oil spout is pivoted at 11 on an extension 12 of the oil spout bracket. So far as the foregoing construction is concerned, it is typical of those in use heretofore.

The brake mechanism provided by this invention comprises a spring arm 13, the upper end portions of which are bent around and anchored to the pivot pin 11 and another pin 14 also fixed in the extension 12. This arm is so biased that it normally assumes substantially an upright position. A brake shoe 15 is secured to the lower end of the arm where it normally is slightly spaced from the edge of the thickened lower rim of the whirl 16 by which the spindle blade 2 is driven. Fulcrumed at 17 on the bracket 7 is an operating lever 18, preferably made of pressed metal, and having an upper portion straddling the bracket and a lower plate-like portion which is located at the front of the spindle in a convenient position either to be engaged by the operator's knee or to be operated by hand. At its upper end this lever carries two pins 21 and 22 positioned, respectively, above and below the fulcrum 17, the opposite ends of the pins being anchored in the two arms of the lever.

Figure 2:
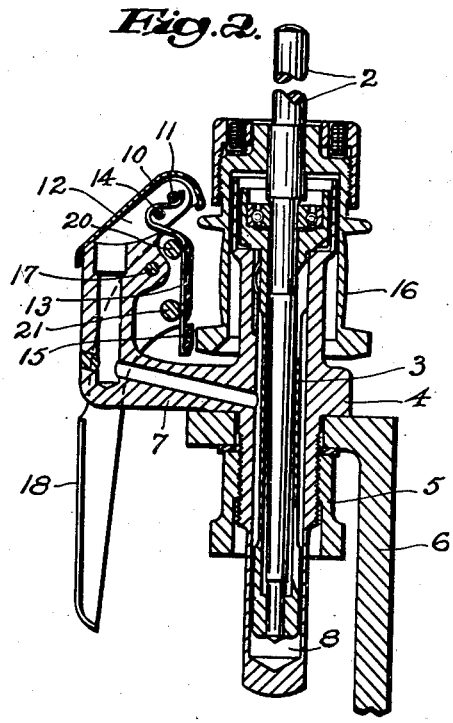
Fig. 2 is a vertical, sectional view on the line 2—2, Fig. 1.
Figure 3:
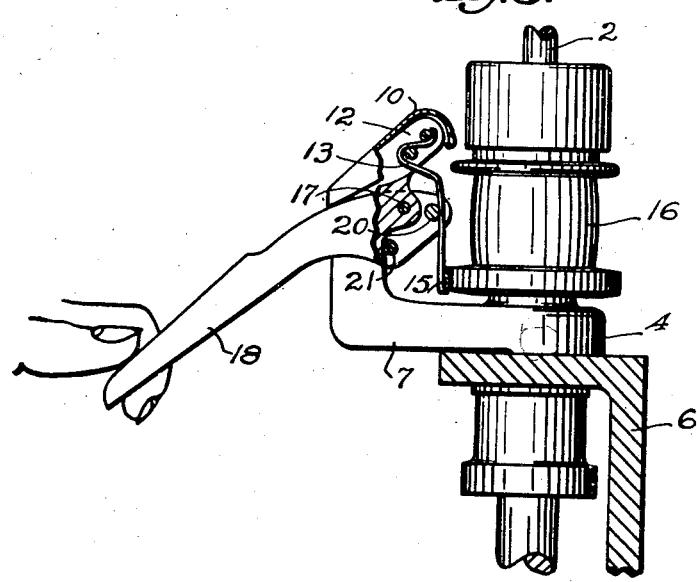
Fig. 3 is a side view, mainly in elevation, with some parts broken away, illustrating one manner in which the brake may be used.

It will be evident from an inspection of Fig. 2 that if the operator presses against the lower end of the lever 18, the lower pin 21 will engage the spring arm 13 and force the brake shoe against the whirl, thus stopping its rotation. When the pressure on the lever 18 has been removed, the spring 13 will return to its original position, as shown in Fig. 2, and rotation of the spindle will be resumed. On the other hand, if it is more convenient for the operator to lift the lever 18 by hand, as shown in Fig. 3, then the upper pin 20 will engage the spring arm 13 and force the brake shoe against the whirl, as before. This pin is so located as to go past the dead center relationship to the fulcrum 17 and the spring, as shown in Fig. 3, where these parts cooperate to lock the lever or handle 18 in its brake-setting position. The handle will remain in that position until again moved downwardly. This is an important advantage in that it permits the operator not only to use both hands in removing the bobbin, piecing up the ends, and attend to other duties, but to perform these operations while the spindle is still held locked against rotation without the usual restriction imposed on his activities by the necessity for maintaining pressure on the brake lever with his leg or knee.

From the foregoing it will be seen that the invention provides an exceptionally compact and simple spindle brake structure in which the actuating element is conveniently positioned for operation either by hand or by the operator's knee. It is sturdy and substantial in construction; not liable to get out of order; very positive in action; and capable of giving long, trouble-free service.

While I have herein shown and described a preferred embodiment of my invention, it is evident that the invention is not limited to embodiment in the precise form shown.

Having thus described my invention, what I desire to claim as new is:

1. A spindle structure comprising a spindle blade, a base in which said blade is mounted for rotation, a whirl fast on said blade, said base having an oil spout bracket extending laterally therefrom with an outer upstanding end portion positioned approximately parallel with, but spaced from, said whirl, and a brake for said whirl including a normally stationary spring arm supported at its upper end in parts rigid with said bracket and normally positioned approximately vertically beside said whirl, a brake shoe carried by the lower end of said arm, an operating lever pivoted on said bracket, and two pins carried by said lever and positioned one above and one below the fulcrum point of the lever and beside said arm, whereby the movement of said lever on its fulcrum in either direction will operate through one or the other of said pins to swing said arm and set said brake, said arm and said pins being located between the upstanding portion of said bracket and said whirl.

2. A spindle structure according to preceding claim 1, in which one of said pins is positioned to be moved past its dead center relationship to said fulcrum where it will lock the brake in position to hold the spindle against rotation.

3. A spindle structure comprising the combination with a spindle blade, a base in which said blade is mounted for rotation and a whirl fast on said blade, said base including an oil spout bracket extending laterally therefrom and provided with an outer upstanding end portion positioned beside said whirl, of a brake for said spindle including a spring arm occupying a generally vertical position between said upstanding end portion of said bracket and said whirl, a brake shoe carried by said arm and positioned to engage a lateral surface of said whirl, and a lever fulcrumed on said bracket and operable to force the brake shoe into contact with said whirl.

4. A spindle structure comprising the combination with a spindle blade, a base in which said blade is mounted for rotation and a whirl fast on said blade, said base including an oil spout bracket extending laterally therefrom and provided with an outer upstanding end portion positioned beside said whirl, of a brake for said spindle including a spring arm occupying a generally vertical position between said upstanding end portion of said bracket and said whirl, a brake shoe carried by said arm and positioned to engage a lateral surface of said whirl, said arm being biased to hold said brake shoe normally out of contact with the whirl, a lever fulcrumed on said bracket, and parts operated by said lever when swung in either direction away from a neutral position to force said brake shoe into contact with said whirl.

5. A spindle structure comprising the combination with a spindle blade, a base in which said blade is mounted for rotation and a whirl fast on said blade, said base including an oil spout bracket extending laterally therefrom and provided with an outer upstanding end portion positioned beside said whirl, of a brake for said spindle including a spring arm occupying a generally vertical position between said upstanding end portion of said bracket and said whirl, a brake shoe carried by said arm and positioned to engage a lateral surface of said whirl, said arm being biased to hold said brake shoe normally out of contact with the whirl, and a lever fulcrumed on said bracket and operable on said arm to force the brake shoe into engagement with said whirl and to lock it in contact therewith.

6. A spindle structure according to preceding claim 3, in which said oil spout bracket includes an extension projecting from its upper end, and said spring arm is secured to said extension, extends downwardly beside said whirl, and said brake shoe is mounted on the lower end of said arm.

7. A spindle structure according to preceding claim 4, in which said lever straddles said oil spout, is fulcrumed at the inner side of said spout, and carries two pins positioned one above and one below said fulcrum, and said spring arm is positioned between said pins and said whirl.

VIRGIL A. BURNHAM.